US010764833B2

(12) United States Patent
Hosseini et al.

(10) Patent No.: US 10,764,833 B2
(45) Date of Patent: Sep. 1, 2020

(54) UPLINK PREEMPTION OR DYNAMIC POWER CONTROL FOR MOBILE BROADBAND AND LOW LATENCY COMMUNICATION MULTIPLEXING

(71) Applicant: QUALCOMM Incorporated, San Diego, CA (US)

(72) Inventors: Seyedkianoush Hosseini, San Diego, CA (US); Xiao Feng Wang, San Diego, CA (US); Chih-Ping Li, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/384,833

(22) Filed: Apr. 15, 2019

(65) Prior Publication Data

US 2019/0320393 A1 Oct. 17, 2019

Related U.S. Application Data

(60) Provisional application No. 62/658,402, filed on Apr. 16, 2018.

(51) Int. Cl.
*H04W 76/27* (2018.01)
*H04W 52/14* (2009.01)
(Continued)

(52) U.S. Cl.
CPC ....... *H04W 52/146* (2013.01); *H04W 72/044* (2013.01); *H04W 72/1278* (2013.01); *H04W 76/27* (2018.02)

(58) Field of Classification Search
CPC . H04W 52/146; H04W 76/27; H04W 72/044; H04W 72/1278
(Continued)

(56) References Cited

U.S. PATENT DOCUMENTS 7,154,442 B2 * 12/2006 van Wonterghem .. H01Q 1/243
343/702
8,060,017 B2 * 11/2011 Schlicht ................ H04L 1/0015
455/41.2
(Continued)

FOREIGN PATENT DOCUMENTS

| WO | WO-03001702 A1 | 1/2003 |
| WO | WO-2016056993 A2 | 4/2016 |
| WO | WO-2016164611 A1 | 10/2016 |

OTHER PUBLICATIONS

International Search Report and Written Opinion—PCT/US2019/027646—ISA/EPO—dated Jun. 28, 2019.
(Continued)

*Primary Examiner* — Hai V Nguyen
(74) *Attorney, Agent, or Firm* — Holland & Hart LLP Qualcomm Incorporated

(57) ABSTRACT

Some wireless communications systems may support mobile broadband (MBB) communications and low latency communications. To facilitate low latency communications, a base station may assign resources allocated for an MBB transmission for a low latency transmission. As described herein, to limit interference between an MBB transmission and a low latency transmission while maximizing the chances that the MBB transmission is received, an MBB user equipment (UE) may be configured to adjust a transmit power for the MBB transmission to limit the impact on a low latency transmission without preempting the MBB transmission. However, if the MBB UE is unable to adjust the transmit power for the MBB transmission prior to the MBB transmission, the MBB UE may determine whether to drop a portion of the MBB transmission on the resources assigned for the low latency transmission (e.g., based on whether a received power of the MBB transmission exceeds a threshold).

30 Claims, 9 Drawing Sheets

(51) Int. Cl.
*H04W 72/12* (2009.01)
*H04W 72/04* (2009.01)

(58) Field of Classification Search
USPC .................................................. 455/522, 69
See application file for complete search history.

(56) References Cited

U.S. PATENT DOCUMENTS

| | | | |
|---|---|---|---|
| 9,838,978 B1 | 12/2017 | Sung et al. | |
| 9,883,485 B2* | 1/2018 | Zhang | H04L 5/005 |
| 10,104,683 B2* | 10/2018 | Chen | H04L 5/0044 |
| 10,149,293 B2* | 12/2018 | Damnjanovic | H04W 72/14 |
| 10,205,581 B2* | 2/2019 | Islam | H04L 27/2602 |
| 10,285,028 B2* | 5/2019 | Chincholi | H04W 4/70 |
| 10,368,336 B2* | 7/2019 | Zhang | H04W 72/005 |
| 10,420,080 B2* | 9/2019 | Yang | H04L 5/0044 |
| 10,420,128 B2* | 9/2019 | Ozturk | H04L 5/0078 |
| 2009/0252134 A1* | 10/2009 | Schlicht | H04L 1/0015 370/338 |
| 2010/0142447 A1* | 6/2010 | Schlicht | H04W 24/02 370/328 |
| 2012/0106428 A1* | 5/2012 | Schlicht | H04L 1/0015 370/312 |
| 2013/0040688 A1 | 2/2013 | Mizusawa | |
| 2015/0092553 A1* | 4/2015 | Sirotkin | H04W 28/0226 370/235 |
| 2016/0113008 A1* | 4/2016 | Damnjanovic | H04L 5/00 370/336 |
| 2016/0234857 A1* | 8/2016 | Chen | H04W 72/1231 |
| 2017/0290004 A1* | 10/2017 | Yang | H04W 72/0446 |
| 2018/0035459 A1* | 2/2018 | Islam | H01L 23/145 |
| 2018/0063865 A1* | 3/2018 | Islam | H04L 5/0087 |
| 2018/0070341 A1* | 3/2018 | Islam | H04L 1/1812 |
| 2018/0083758 A1* | 3/2018 | Islam | H04L 5/0083 |
| 2018/0139770 A1* | 5/2018 | Ozturk | H04L 5/0078 |
| 2018/0191470 A1* | 7/2018 | Manolakos | H04L 1/1861 |
| 2018/0270022 A1* | 9/2018 | Sun | H04L 1/0061 |
| 2018/0279229 A1* | 9/2018 | Dinan | H04W 52/146 |
| 2018/0279262 A1* | 9/2018 | Babaei | H04W 72/04 |
| 2018/0343148 A1* | 11/2018 | Hosseini | H04W 52/325 |
| 2018/0343624 A1* | 11/2018 | Akula | H04W 52/367 |
| 2018/0368107 A1* | 12/2018 | Babaei | H04W 76/00 |
| 2018/0368132 A1* | 12/2018 | Babaei | H04W 76/11 |
| 2019/0037550 A1* | 1/2019 | Zhang | H04L 5/0044 |
| 2019/0074882 A1* | 3/2019 | Zhou | H04W 16/32 |
| 2019/0075524 A1* | 3/2019 | Zhou | H04L 5/005 |
| 2019/0082433 A1* | 3/2019 | Tang | H04W 72/044 |
| 2019/0123883 A1* | 4/2019 | Islam | H04W 72/044 |
| 2019/0149380 A1* | 5/2019 | Babaei | H04W 72/044 370/330 |
| 2019/0159135 A1* | 5/2019 | Molavianjazi | H04L 5/001 |
| 2019/0159136 A1* | 5/2019 | Molavianjazi | H04W 52/365 |
| 2019/0165984 A1* | 5/2019 | Shapin | H04L 27/2666 |
| 2019/0166625 A1* | 5/2019 | Nam | H04L 5/0048 |
| 2019/0174440 A1* | 6/2019 | Kwak | H04W 56/0015 |
| 2019/0208436 A1* | 7/2019 | Zhou | H04B 17/309 |
| 2019/0215781 A1* | 7/2019 | Jeon | H04W 24/10 |
| 2019/0254081 A1* | 8/2019 | Li | H04W 74/0841 |
| 2019/0268127 A1* | 8/2019 | Hosseini | H04L 5/0044 |
| 2019/0306801 A1* | 10/2019 | Zhou | H04W 52/04 |
| 2019/0306848 A1* | 10/2019 | Zhou | H04W 72/08 |
| 2019/0320454 A1* | 10/2019 | Li | H04W 72/0446 |
| 2019/0320467 A1* | 10/2019 | Freda | H04W 74/0833 |
| 2019/0335388 A1* | 10/2019 | Bulakci | H04W 16/16 |

OTHER PUBLICATIONS

Pavel M., et al., "In-Band Device-to-Device Communication in OFDMA Cellular Networks: A Survey and Challenges", IEEE Communications Surveys & Tutorials, vol. 17, No. 4, Nov. 18, 2015 (Nov. 18, 2015), pp. 1885-1922, XP011590611 ,DOI: 10.1109/COMST.2015.2447036 [retrieved on Nov. 18, 2015], p. 10.

Qualcomm Incorporated: "eMBB and URLLC Dynamic Multiplexing and Preemption Indication on the Uplink", 3GPP Draft; R1-1804820 eMBB and URLLC Dynamic Multiplexing and Preemption Indication on the Uplink, 3rd Generation Partnership Project (3GPP), Mobile Competence Centre ; 650, Route Des Lucioles ; F-06,vol. RAN WG1, No. Sanya, China; Apr. 16, 2018-Apr. 20, 2018, Apr. 15, 2018 (Apr. 15, 2018), XP051427086, 11 Pages, Retrieved from the Internet: URL:http://www.3gpp.org/ftp/Meetings%5F3GPP%5FSYNC/RAN1/Docs/ [retrieved on Apr. 15, 2018].

* cited by examiner

UPLINK PREEMPTION OR DYNAMIC POWER CONTROL FOR MOBILE BROADBAND AND LOW LATENCY COMMUNICATION MULTIPLEXING

CROSS REFERENCES

The present application for patent claims the benefit of U.S. Provisional Patent Application No. 62/658,402 by Hosseini, et al., entitled "Uplink Preemption or Dynamic Power Control For Mobile Broadband and Low Latency Communication Multiplexing," filed Apr. 16, 2018, assigned to the assignee hereof, and expressly incorporated by reference herein.

BACKGROUND

The following relates generally to wireless communication and more specifically to uplink preemption or dynamic power control for mobile broadband (MBB) and low latency communication multiplexing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support different types of communications between base stations and UEs, including MBB communications and low latency communications. Conventional techniques for supporting the coexistence of such different types of communications may be deficient.

SUMMARY

Some wireless communications systems may support mobile broadband (MBB) communications and low latency communications. Low latency communications may be associated with bursty and unpredictable transmissions. To facilitate low latency communications, a base station may, in some cases, assign resources allocated for an MBB transmission for a low latency transmission. As described herein, to limit interference between an MBB transmission and a low latency transmission while maximizing the chances that the MBB transmission is received, an MBB user equipment (UE) may be configured to adjust a transmit power for the MBB transmission (when appropriate) to limit the impact on the low latency transmission without preempting the MBB transmission. However, if the MBB UE is unable to adjust the transmit power for the MBB transmission prior to the MBB transmission, the MBB UE may determine whether to drop a portion of the MBB transmission on the resources assigned for the low latency transmission (e.g., based on whether a received power of the MBB transmission exceeds a threshold). Using these techniques, the MBB UE may maximize the chances that an MBB transmission is received since the MBB UE may be more likely to transmit the MBB transmission without preemption.

A method for wireless communication at a UE is described. The method may include identifying a transmission time interval allocated for a first transmission, receiving a preemption indication (PI) indicating that a portion of the transmission time interval is preempted, determining whether a threshold associated with an estimated uplink (UL) received power of the first transmission is satisfied, determining whether to drop at least a portion of the first transmission in the transmission time interval based at least in part on whether the threshold associated with the estimated UL received power of the first transmission is satisfied, and transmitting the first transmission during the transmission time interval in accordance with the determination of whether to drop at least the portion of the first transmission.

An apparatus for wireless communication at a UE is described. The apparatus may include means for identifying a transmission time interval allocated for a first transmission, means for receiving a PI indicating that a portion of the transmission time interval is preempted, means for determining whether a threshold associated with an estimated UL received power of the first transmission is satisfied, means for determining whether to drop at least a portion of the first transmission in the transmission time interval based at least in part on whether the threshold associated with the estimated UL received power of the first transmission is satisfied, and means for transmitting the first transmission during the transmission time interval in accordance with the determination of whether to drop at least the portion of the first transmission.

Another apparatus for wireless communication at a UE is described. The apparatus may include a processor, memory in electronic communication with the processor, and instructions stored in the memory. The instructions may be operable to cause the processor to identify a transmission time interval allocated for a first transmission, receive a PI indicating that a portion of the transmission time interval is preempted, determine whether a threshold associated with an estimated UL received power of the first transmission is satisfied, determine whether to drop at least a portion of the first transmission in the transmission time interval based at least in part on whether the threshold associated with the estimated UL received power of the first transmission is satisfied, and transmit the first transmission during the transmission time interval in accordance with the determination of whether to drop at least the portion of the first transmission.

A non-transitory computer-readable medium for wireless communication at a UE is described. The non-transitory computer-readable medium may include instructions operable to cause a processor to identify a transmission time interval allocated for a first transmission, receive a PI indicating that a portion of the transmission time interval is preempted, determine whether a threshold associated with an estimated UL received power of the first transmission is satisfied, determine whether to drop at least a portion of the first transmission in the transmission time interval based at least in part on whether the threshold associated with the estimated UL received power of the first transmission is satisfied, and transmit the first transmission during the transmission time interval in accordance with the determination of whether to drop at least the portion of the first transmission.

Some examples of the method, apparatus, and non-transitory computer-readable medium described above may further include processes, features, means, or instructions for determining that the UE may be unable to adjust the transmit power to use for the first transmission prior to the first transmission after receiving the PI. In some examples of the method, apparatus, and non-transitory computer-readable medium described above, determining whether to drop at least the portion of the first transmission in the transmission time interval may be further based on the UE being unable to adjust the transmit power to use for the first transmission prior to the first transmission after receiving the PI. In some examples of the method, apparatus, and non-transitory computer-readable medium described above, determining that the UE may be unable to adjust the transmit power to use for the first transmission prior to the first transmission after receiving the PI may be based at least in part on a receive time of the PI, a processing speed at the UE for processing the PI, a transmit power adjustment speed at the UE for adjusting the transmit power, a capability of the UE, or a combination thereof.

In some examples of the method, apparatus, and non-transitory computer-readable medium described above, determining whether to drop at least the portion of the first transmission includes determining to drop at least the portion of the first transmission when a characteristic of the first transmission satisfies the threshold or determining to transmit an entirety of the first transmission when the characteristic of the first transmission fails to satisfy the threshold. In some examples of the method, apparatus, and non-transitory computer-readable medium described above, the characteristic of the first transmission includes the estimated UL received power of the first transmission and the threshold associated with the estimated UL received power of the first transmission includes a threshold received power. In some examples of the method, apparatus, and non-transitory computer-readable medium described above, the characteristic of the first transmission includes a modulation and coding scheme (MCS) scheduled for the first transmission and the threshold associated with the estimated UL received power of the first transmission includes a threshold MCS.

In some examples of the method, apparatus, and non-transitory computer-readable medium described above, the characteristic of the first transmission includes a number of symbols scheduled for the first transmission and the threshold associated with the estimated UL received power of the first transmission includes a threshold number of symbols. In some examples of the method, apparatus, and non-transitory computer-readable medium described above, the characteristic of the first transmission includes a number of bits to be included in the first transmission and the threshold associated with the estimated UL received power of the first transmission includes a threshold number of bits. In some examples of the method, apparatus, and non-transitory computer-readable medium described above, the characteristic of the first transmission includes a subcarrier spacing scheduled for the first transmission and the threshold associated with the estimated UL received power of the first transmission includes a threshold subcarrier spacing. In some examples of the method, apparatus, and non-transitory computer-readable medium described above, the PI includes a group-common PI or a UE-specific PI. In some examples of the method, apparatus, and non-transitory computer-readable medium described above, a second transmission which preempts the first transmission in accordance with the PI may have a higher priority than the first transmission.

In some examples of the method, apparatus, and non-transitory computer-readable medium described above, the first transmission includes an MBB transmission, and a second transmission which preempts the first transmission in accordance with the PI includes a low latency transmission. In some examples of the method, apparatus, and non-transitory computer-readable medium described above, the threshold associated with the estimated UL received power of the first transmission may be configured via higher layer signaling. In some examples of the method, apparatus, and non-transitory computer-readable medium described above, the higher layer signaling includes radio resource control (RRC) signaling or system information signaling. In some examples of the method, apparatus, and non-transitory computer-readable medium described above, the threshold associated with the estimated UL received power of the first transmission may be configured via downlink control information (DCI).

A method for wireless communication at a UE is described. The method may include identifying a transmission time interval allocated for a first transmission, receiving a PI indicating that a portion of the transmission time interval is preempted, determining whether at least one threshold associated with an estimated UL received power of the first transmission is satisfied, determining a transmit power to use for the first transmission in the transmission time interval based at least in part on whether the at least one threshold associated with the estimated UL received power of the first transmission is satisfied, and transmitting the first transmission during the transmission time interval in accordance with the determination of the transmit power to use for the first transmission.

An apparatus for wireless communication at a UE is described. The apparatus may include means for identifying a transmission time interval allocated for a first transmission, means for receiving a PI indicating that a portion of the transmission time interval is preempted, means for determining whether at least one threshold associated with an estimated UL received power of the first transmission is satisfied, means for determining a transmit power to use for the first transmission in the transmission time interval based at least in part on whether the at least one threshold associated with the estimated UL received power of the first transmission is satisfied, and means for transmitting the first transmission during the transmission time interval in accordance with the determination of the transmit power to use for the first transmission.

Another apparatus for wireless communication at a UE is described. The apparatus may include a processor, memory in electronic communication with the processor, and instructions stored in the memory. The instructions may be operable to cause the processor to identify a transmission time interval allocated for a first transmission, receive a PI indicating that a portion of the transmission time interval is preempted, determine whether at least one threshold associated with an estimated UL received power of the first transmission is satisfied, determine a transmit power to use for the first transmission in the transmission time interval based at least in part on whether the at least one threshold associated with the estimated UL received power of the first transmission is satisfied, and transmit the first transmission during the transmission time interval in accordance with the determination of the transmit power to use for the first transmission.

A non-transitory computer-readable medium for wireless communication at a UE is described. The non-transitory computer-readable medium may include instructions operable to cause a processor to identify a transmission time interval allocated for a first transmission, receive a PI indicating that a portion of the transmission time interval is preempted, determine whether at least one threshold associated with an estimated UL received power of the first transmission is satisfied, determine a transmit power to use for the first transmission in the transmission time interval based at least in part on whether the at least one threshold associated with the estimated UL received power of the first transmission is satisfied, and transmit the first transmission during the transmission time interval in accordance with the determination of the transmit power to use for the first transmission.

Some examples of the method, apparatus, and non-transitory computer-readable medium described above may further include processes, features, means, or instructions for determining that the UE may be able to adjust the transmit power to use for the first transmission prior to the first transmission after receiving the PI. In some examples of the method, apparatus, and non-transitory computer-readable medium described above, determining the transmit power to use for the first transmission in the transmission time interval may be further based on the UE being able to adjust the transmit power to use for the first transmission prior to the first transmission after receiving the PI. In some examples of the method, apparatus, and non-transitory computer-readable medium described above, determining that the UE may be able to adjust the transmit power to use for the first transmission prior to the first transmission after receiving the PI may be based at least in part on a receive time of the PI, a processing speed at the UE for processing the PI, a transmit power adjustment speed at the UE for adjusting the transmit power, a capability of the UE, or a combination thereof.

In some examples of the method, apparatus, and non-transitory computer-readable medium described above, determining the transmit power to use for the first transmission in the transmission time interval includes determining the transmit power to use for the first transmission in the transmission time interval based at least in part on whether a characteristic of the first transmission satisfies the at least one threshold. In some examples of the method, apparatus, and non-transitory computer-readable medium described above, determining the transmit power to use for the first transmission in the transmission time interval includes determining that the characteristic of the first transmission satisfies a first threshold associated with the estimated UL received power of the first transmission and adjusting the transmit power for the first transmission based at least in part on a received power corresponding to the first threshold.

In some examples of the method, apparatus, and non-transitory computer-readable medium described above, determining the transmit power to use for the first transmission in the transmission time interval includes determining that the characteristic of the first transmission fails to satisfy a first threshold associated with the estimated UL received power of the first transmission and satisfies a second threshold associated with the estimated UL received power of the first transmission and adjusting the transmit power for the first transmission based at least in part on a received power corresponding to the second threshold. In some examples of the method, apparatus, and non-transitory computer-readable medium described above, determining the transmit power to use for the first transmission in the transmission time interval includes determining that the characteristic of the first transmission fails to satisfy a first threshold associated with the estimated UL received power of the first transmission and a second threshold associated with the estimated UL received power of the first transmission and avoiding adjusting the transmit power for the first transmission.

In some examples of the method, apparatus, and non-transitory computer-readable medium described above, the characteristic of the first transmission includes a received power of the first transmission and the at least one threshold associated with the received power of the first transmission includes a threshold received power. In some examples of the method, apparatus, and non-transitory computer-readable medium described above, the characteristic of the first transmission includes a modulation and coding scheme (MCS) scheduled for the first transmission and the at least one threshold associated with the received power of the first transmission includes a threshold MCS. In some examples of the method, apparatus, and non-transitory computer-readable medium described above, the characteristic of the first transmission includes a number of symbols scheduled for the first transmission and the at least one threshold associated with the received power of the first transmission includes a threshold number of symbols.

In some examples of the method, apparatus, and non-transitory computer-readable medium described above, the characteristic of the first transmission includes a number of bits to be included in the first transmission and the at least one threshold associated with the received power of the first transmission includes a threshold number of bits. In some examples of the method, apparatus, and non-transitory computer-readable medium described above, the characteristic of the first transmission includes a subcarrier spacing scheduled for the first transmission and the at least one threshold associated with the received power of the first transmission includes a threshold subcarrier spacing. In some examples of the method, apparatus, and non-transitory computer-readable medium described above, the PI includes a group-common PI or a UE-specific PI. In some examples of the method, apparatus, and non-transitory computer-readable medium described above, a second transmission that preempts the first transmission in accordance with the PI may have a higher priority than the first transmission.

In some examples of the method, apparatus, and non-transitory computer-readable medium described above, the first transmission includes an MBB transmission, and a second transmission which preempts the first transmission in accordance with the PI includes a low latency transmission. In some examples of the method, apparatus, and non-transitory computer-readable medium described above, the at least one threshold associated with the estimated UL received power of the first transmission may be configured via higher layer signaling. In some examples of the method, apparatus, and non-transitory computer-readable medium described above, the higher layer signaling includes RRC signaling or system information signaling. In some examples of the method, apparatus, and non-transitory computer-readable medium described above, the at least one threshold associated with the estimated UL received power of the first transmission may be configured via DCI.

DETAILED DESCRIPTION

Figure 1:
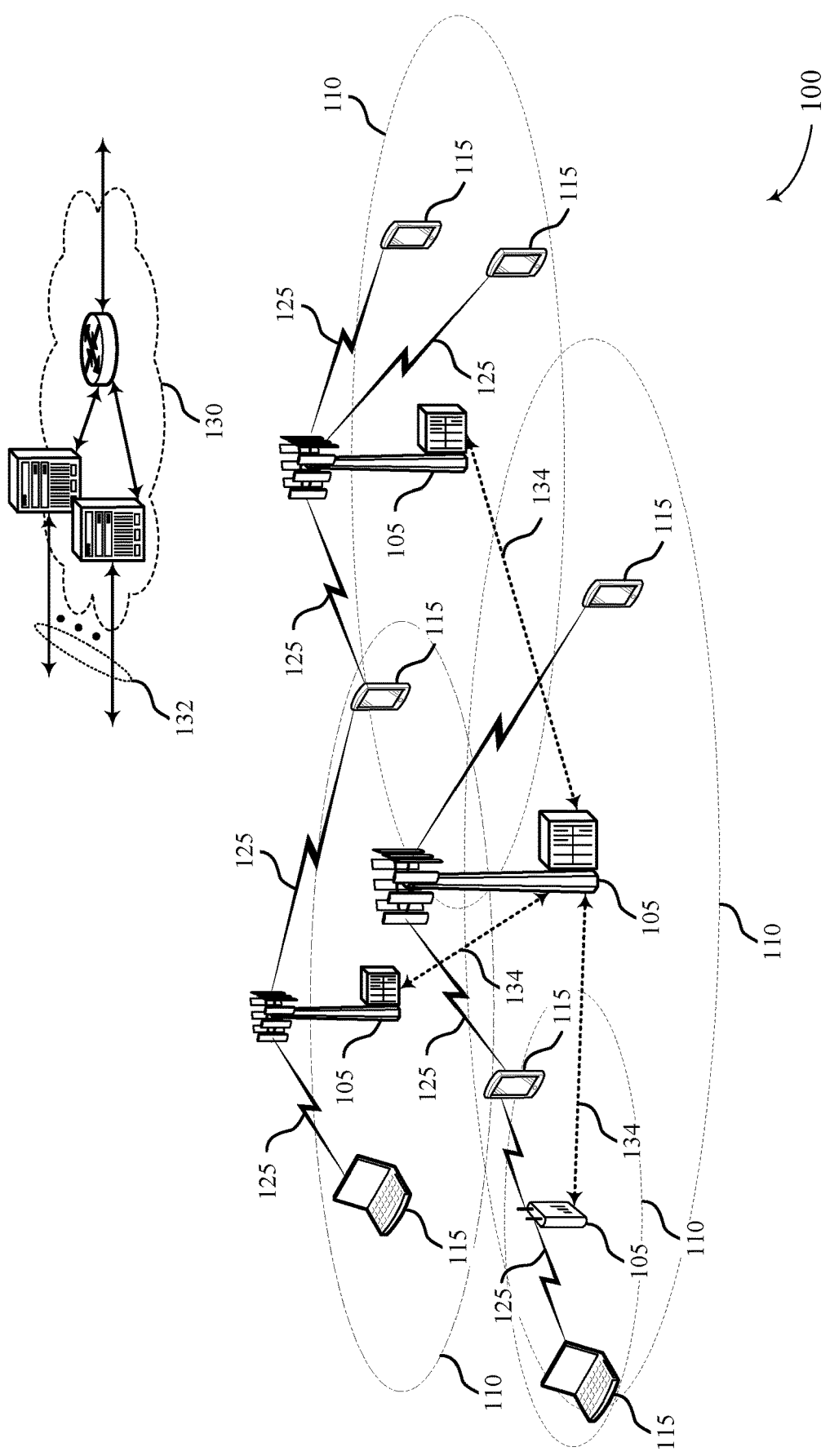
FIG. 1 illustrates an example of a wireless communications system that supports uplink preemption or dynamic power control for mobile broadband (MBB) and low latency communication multiplexing in accordance with aspects of the present disclosure.

Some wireless communications systems may support mobile broadband (MBB) communications and low latency communications between a base station and one or more user equipment (UEs). A UE configured to operate in an MBB mode may be referred to as an MBB UE, and a UE configured to operate in a low latency mode may be referred to as a low latency UE. Low latency communications may be associated with bursty and unpredictable transmissions. To facilitate such communications, a base station may identify resources originally allocated for MBB communications, and the base station may assign these resources for low latency communications. In such cases, the base station may transmit a preemption indication (PI) to inform the MBB UE that a portion of the resources allocated for MBB communications is assigned for low latency communications.

When an MBB UE receives the PI, the MBB UE may identify the resources assigned for the low latency communications, and the MBB UE may preempt an MBB transmission to accommodate the low latency communications. Thus, the MBB UE may avoid interfering with the low latency transmission, which may improve the chances that the low latency transmission is received. In some aspects, however, an MBB transmission from an MBB UE may have negligible impact on a low latency transmission, and the MBB transmission may still be preempted to accommodate the low latency transmission (e.g., if the MBB UE receives a PI). When such MBB transmissions are preempted to accommodate low latency communications, the chances that these transmissions are received may be reduced, while the chances that the low latency transmission is received may not be significantly increased.

As described herein, a wireless communications system may support efficient techniques for accommodating a low latency transmission while maximizing the chances that an MBB transmission is received. In particular, an MBB UE may be configured to adjust a transmit power for the MBB transmission (when appropriate) to limit the impact on the low latency transmission without preempting the MBB transmission. However, if the MBB UE is unable to adjust the transmit power for the MBB transmission prior to the MBB transmission, the MBB UE may determine whether to drop a portion of the MBB transmission on the resources assigned for the low latency transmission (e.g., based on whether a received power of the MBB transmission exceeds a threshold). Using these techniques, the MBB UE may maximize the chances that an MBB transmission is received since the MBB UE may be more likely to transmit the MBB transmission without preemption.

Further, in some aspects, because the MBB UE may determine whether to drop a portion of an MBB transmission or adjust a transmit power for the portion of the MBB transmission based on whether the received power of the MBB transmission exceeds a threshold (e.g., where the amount of received power may be directly related to an effect on a low latency transmission), the MBB UE may avoid dropping the portion of the MBB transmission or lowering a transmit power for the portion of the MBB transmission when a low latency transmission is not likely to be significantly affected by the MBB transmission. That is, in some cases, the UE may drop a portion of an MBB transmission or lower the transmit power of an MBB transmission when the estimated received power of the MBB transmission (e.g., calculated based on the originally configured transmit power) is too high or above a threshold. Otherwise, the UE may transmit an entirety of the MBB transmission with the transmit power originally configured for the MBB transmission.

Aspects of the disclosure introduced above are described below in the context of a wireless communications system. Examples of processes and signaling exchanges that support uplink preemption or dynamic power control for MBB and low latency communication multiplexing are then described. Aspects of the disclosure are further illustrated by and described with reference to apparatus diagrams, system diagrams, and flowcharts that relate to uplink preemption or dynamic power control for MBB and low latency communication multiplexing.

FIG. 1 illustrates an example of a wireless communications system 100 that supports uplink preemption or dynamic power control for MBB and low latency communication multiplexing in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, ultra-reliable low latency communications (URLLCs), or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)) or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In wireless communications system 100, a transmission time interval may be defined as the smallest unit of time in which a base station 105 may schedule a UE 115 for uplink or downlink transmissions, or a transmission time interval may be defined as any time resource available for communications between a base station 105 and a UE 115 in the wireless system (e.g., symbols, groups of symbols, slots, etc.). As an example, a base station 105 may allocate one or more transmission time intervals for downlink communication with a UE 115. The UE 115 may then monitor the one or more transmission time intervals to receive downlink signals from the base station 105. In some wireless communications systems (e.g., LTE systems), a subframe may be the basic unit of scheduling or transmission time interval. In other cases, such as with low latency operation, a different, reduced-duration transmission time interval (e.g., a short transmission time interval) may be used (e.g., a mini-slot). Wireless communications system 100 may employ various transmission time interval durations, including those that facilitate URLLC and MBB communications, in addition to other types of communication associated with LTE and NR.

A resource element may consist of one symbol period and one subcarrier (e.g., a 15 kHz frequency range). In some cases, the numerology employed within a system (i.e., subcarrier size, symbol-period duration, and/or transmission time interval duration) may be selected or determined based on a type of communication. The numerology may be selected or determined in view of an inherent tradeoff between latency for low latency applications and efficiency for other applications, for example. In some cases, the duration of time slots allocated for MBB communications may be greater than the duration of time slots allocated for URLLC. Time slots allocated for URLLC may be referred to as mini-slots.

In some cases, a base station 105 may semi-statically allocate resources for low latency communications and MBB communications, and these different types of communications may be multiplexed over time and frequency resources. However, because low latency communications may be unpredictable, it may be challenging for a base station 105 to allocate an appropriate amount of resources for low latency communications with a UE 115. For example, if the base station allocates a small amount of resources for low latency communications, there may not be sufficient resources available for communication when data traffic is high. Alternatively, if a base station allocates a large amount of resources for low latency communications, resources may be unused when data traffic is low. Accordingly, rather than semi-statically allocating resources for low latency communication, a base station 105 may interrupt (or preempt) MBB communications to accommodate bursty low latency communications.

Thus, low latency communications and MBB communications may be multiplexed in the time domain using preemption. In such cases, the base station 105 may indicate the resources assigned (or preempted) for low latency communications to a UE 115 operating in a low latency mode (i.e., a low latency UE 115) and a UE 115 operating in an MBB mode (i.e., an MBB UE 115). Specifically, the base station 105 may transmit an indication to the low latency UE 115 and the MBB UE 115 to inform the UEs 115 of the resources assigned for low latency communications. The indication may be referred to as a PI and may contain information such as a flag on the resources reassigned for low latency communications, the specific time and frequency resources reassigned, power ratio information to be used for communication on the reassigned resources, etc.

Figure 2:
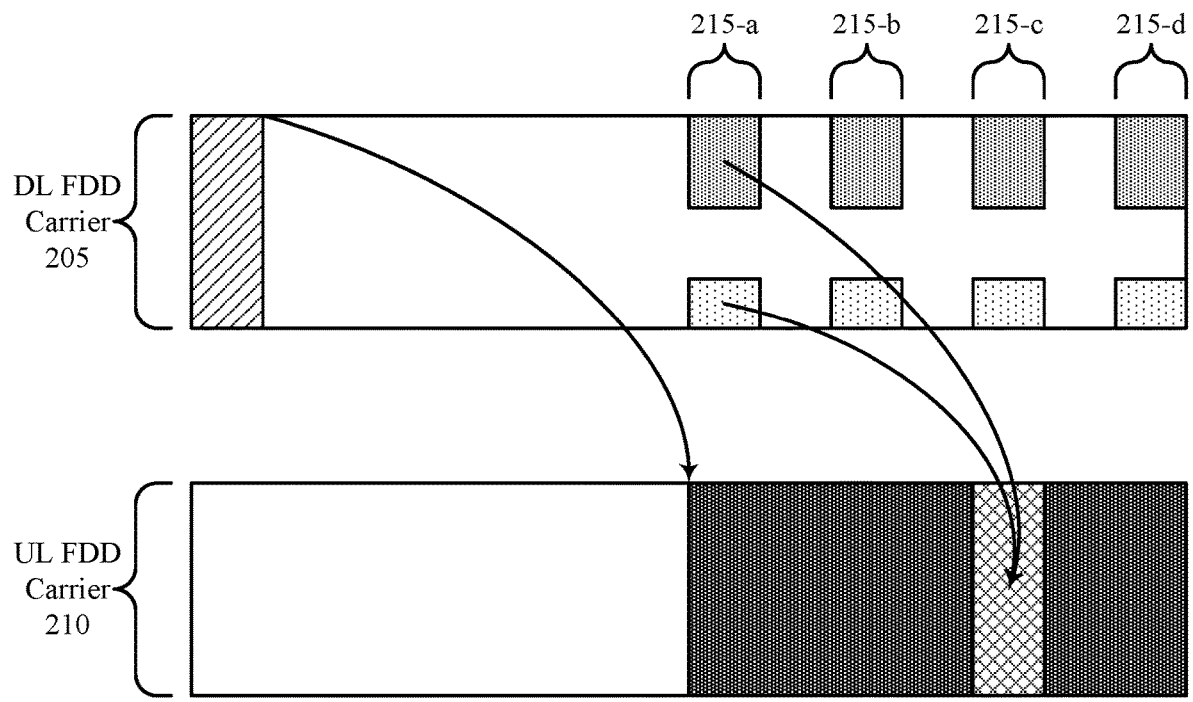
FIG. 2 illustrates an example of a preemption indication (PI) scheme in accordance with aspects of the present disclosure.

FIG. 2 illustrates an example of a PI scheme 200 in accordance with aspects of the present disclosure. In the example of FIG. 2, a base station 105 may communicate with an MBB UE 115 on uplink and downlink frequency division duplexing (FDD) carriers, including downlink FDD carrier 205 and uplink FDD carrier 210. The base station 105 may transmit downlink control information (DCI) in MBB PDCCH 220 to schedule an uplink transmission from the MBB UE 115 in MBB PUSCH 225. In some cases, however, the base station 105 may identify an uplink low latency transmission to schedule. As such, the base station 105 may schedule the uplink low latency transmission on the resources originally allocated for the uplink transmission from the MBB UE 115 in MBB PUSCH 225 (e.g., to minimize the latency for the low latency transmission).

As illustrated, the base station 105 may transmit a PI in a PI monitoring occasion 230 in a mini-slot 215-a (e.g., in addition to other control information in a mini-slot scheduling occasion 235 in mini-slot 215-a) to notify the MBB UE 115 that a portion of the resources originally allocated for the uplink transmission from the MBB UE 115 (e.g., in mini-slot 215-c) has been assigned for the uplink low latency transmission in the low latency PUSCH 240. When the MBB UE 115 receives the PI, the MBB UE 115 may identify the resources assigned for the low latency PUSCH 240, and the MBB UE 115 may preempt MBB PUSCH 225 to accommodate the low latency PUSCH 240. Thus, the MBB UE 115 may avoid interfering with the low latency PUSCH 240, which may improve the chances that the low latency PUSCH 240 is received.

In some aspects, however, an uplink MBB transmission may have a negligible impact on a low latency transmission (i.e., negligible interference), and the MBB transmission may still be preempted to accommodate the low latency transmission. For example, if a PI is received by multiple UEs 115 (e.g., in a group-common DCI), uplink MBB transmissions from some of the UEs may have a negligible impact on the low latency transmission (e.g., based on the locations of the UEs and the received power of uplink MBB transmissions from the UEs). Accordingly, by preempting such uplink MBB transmissions, the chances that these transmissions are received by a base station 105 may be reduced, while the chances that the low latency transmission is received may not be significantly increased. Wireless communications system 100 may support efficient techniques for accommodating a low latency transmission while maximizing the chances that an MBB transmission is received.

Figure 3:
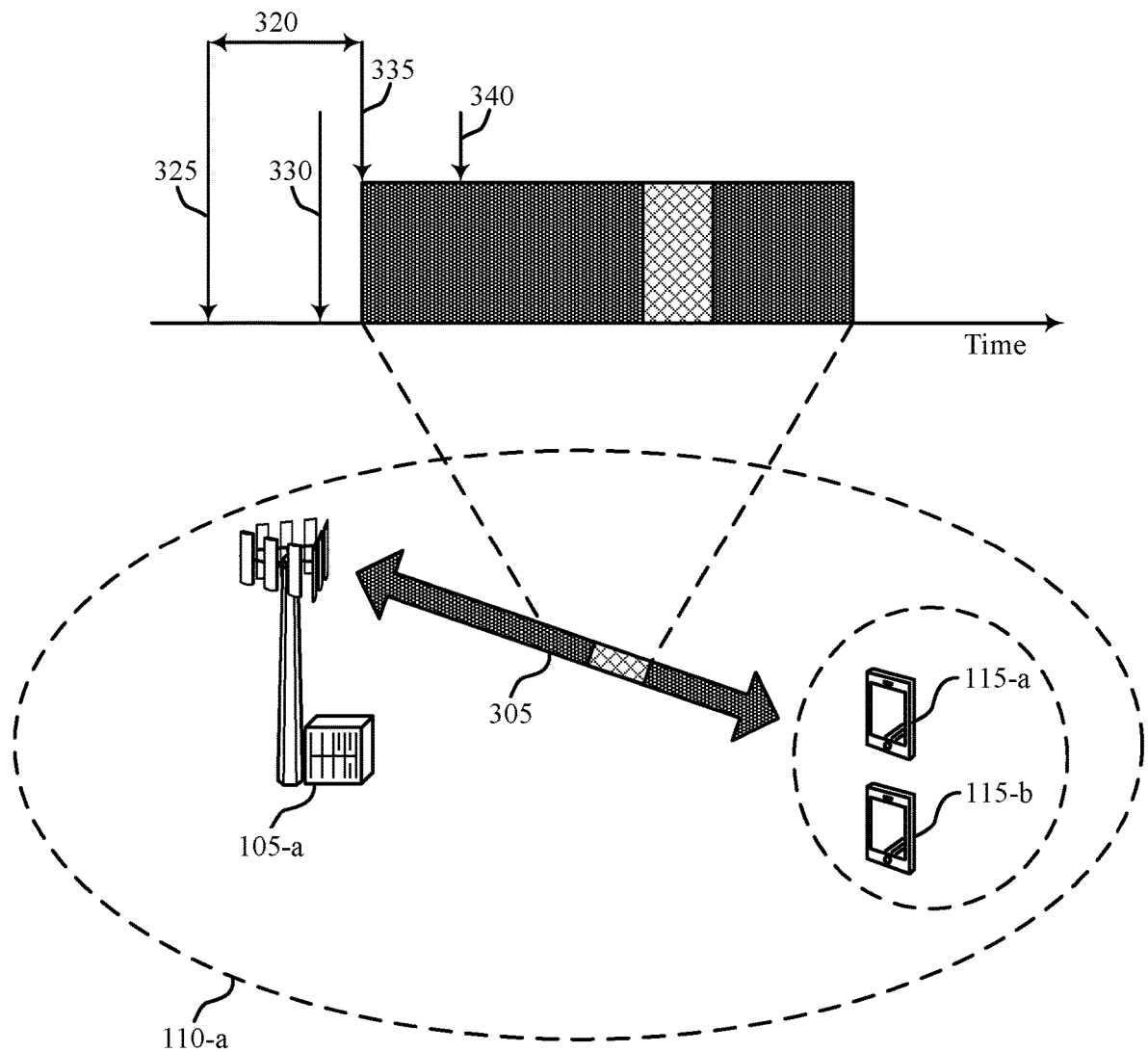
FIG. 3 illustrates an example of a wireless communications system that supports uplink preemption or dynamic power control for MBB and low latency communication multiplexing in accordance with aspects of the present disclosure.

FIG. 3 illustrates an example of a wireless communications system 300 that supports uplink preemption or dynamic power control for MBB and low latency communication multiplexing in accordance with aspects of the present disclosure. Wireless communications system 300 may include base station 105-a, which may be an example of a base station 105 described with reference to FIGS. 1 and 2. Wireless communications system 300 may also include UE 115-a and UE 115-b, which may be examples of UEs 115 described with reference to FIGS. 1 and 2. Base station 105-a may communicate with UE 115-a and UE 115-b on resources of a carrier 305. In the present example, UE 115-a may operate in an MBB mode and may be referred to as an MBB UE 115-a, and UE 115-b may operate in a low latency mode and may be referred to as a low latency UE 115-b. Base station 105-a may provide communication coverage for a respective coverage area 110-a, which may be an example of a coverage area 110 described with reference to FIG. 1. Although the present example describes communication between a base station and two UEs, it is to be understood that the techniques described herein are applicable to a single UE capable of operating in an MBB mode and a low latency mode.

Wireless communications system 300 may implement aspects of wireless communications system 100. For example, wireless communications system 300 may support efficient techniques for accommodating a low latency transmissions 315 while maximizing the chances that an MBB transmission 310 is received. To accommodate a low latency transmission and maximize the chances that an MBB transmission is received when a portion of the resources allocated for the MBB transmission is assigned for the low latency transmission, MBB UE 115-*a* may be configured to reduce the transmit power of the MBB transmission (e.g., using dynamic power control), as opposed to preempting the MBB transmission. By reducing the transmit power of the MBB transmission, MBB UE 115-*a* may limit the interference on the low latency transmission, while avoiding preempting the MBB transmission.

In wireless communications system 300, however, if MBB UE 115-*a* is scheduled for an uplink transmission starting at 335, and MBB UE 115-*a* receives a PI at 340 indicating that a portion of the resources allocated for the MBB transmission is assigned for a low latency transmission (as illustrated), MBB UE 115-*a* may not be able to adjust the transmit power of the MBB transmission prior to the MBB transmission, and adjusting the transmit power of the MBB transmission during the MBB transmission may cause phase discontinuity. Further, even if MBB UE 115-*a* receives the PI before the MBB transmission (e.g., at 330), MBB UE 115-*a* may, in some cases, still not be able to adjust a transmit power for the MBB transmission before the MBB transmission, since it may take MBB UE 115-*a* a certain amount of time 320 to process the PI and perform calculations to determine the transmit power for the MBB transmission.

Thus, MBB UE 115-*a* may not be able to adjust the transmit power for an MBB transmission in all cases when resources originally allocated for the MBB transmission are assigned for a low latency transmission. Further, the time taken to process the PI and perform calculations to determine the transmit power for the MBB transmission may be different for different MBB UEs 115 (i.e., depending on the capabilities of different MBB UEs 115). As such, it may be challenging to configure an MBB UE to adjust the transmit power for an MBB transmission conflicting with a low latency transmission. As described herein, an MBB UE 115-*a* may be configured to adjust the transmit power for an MBB transmission in conflict with a low latency transmission when the MBB UE 115-*a* is able to adjust the transmit power prior to the MBB transmission (e.g., if the PI is received at or before 325, as illustrated in FIG. 3). Alternatively, when the MBB UE 115-*a* is unable to adjust the transmit power for an MBB transmission prior to the MBB transmission, the MBB UE 115-*a* may determine whether to drop a portion of the MBB transmission to avoid interfering with the low latency transmission (e.g., based on whether a received power of the MBB transmission exceeds a threshold).

When a portion of the resources allocated for an MBB transmission is assigned for a low latency transmission, and MBB UE 115-*a* is able to adjust the transmit power for the MBB transmission prior to the MBB transmission, the MBB UE 115-*a* may adjust the transmit power for the MBB transmission (if appropriate). For instance, the MBB UE 115-*a* may determine an estimated received power of the MBB transmission based on the transmit power configured to be used for the MBB transmission, and, if the estimated received power is above a first threshold (e.g., P1), the MBB UE 115-*a* may adjust the transmit power to correspond to a received power of the first threshold (i.e., the transmit power may be lowered such that the transmit power results in a received power equal to the first threshold received power). If the estimated received power is below the first threshold (e.g., P1) and above a second threshold (e.g., P2), the MBB UE 115-*a* may adjust the transmit power to correspond to a received power of the second threshold (i.e., the transmit power may be lowered such that the transmit power results in a received power equal to the second threshold received power). If the estimated received power is below the first threshold (e.g., P1) and below the second threshold (e.g., P2), the MBB UE 115-*a* may avoid adjusting the transmit power for the MBB transmission (i.e., since the interference on the low latency transmission may be negligible).

Alternatively, when a portion of the resources allocated for an MBB transmission is assigned for a low latency transmission, and MBB UE 115-*a* is unable to adjust the transmit power for the MBB transmission prior to the MBB transmission, MBB UE 115-*a* may determine whether to drop a portion of the MBB transmission on the resources assigned for the low latency transmission. For instance, the MBB UE 115-*a* may estimate a received power associated with a transmit power configured to be used for the MBB transmission, and, if the estimated received power is above a threshold (e.g., P1), the MBB UE 115-*a* may drop the portion of the MBB transmission on the resources assigned for the low latency transmission. However, if the estimated received power is below the threshold, the MBB UE 115-*a* may transmit an entirety of the MBB transmission (i.e., since the interference on the low latency transmission may be negligible).

The examples described above are directed to comparing the estimated received power of an MBB transmission to a threshold to determine whether and how to adjust a transmit power for the MBB transmission or to determine whether to drop a portion of the MBB transmission. However, it is to be understood that MBB UE 115-*a* may determine whether and how to adjust a transmit power for an MBB transmission or determine whether to drop a portion of an MBB transmission based on other characteristics associated with the received power of the MBB transmission (as discussed below with reference to FIG. 4). Further, it is to be understood that a transmit power associated with or corresponding to a received power may be a transmit power used by a transmitting device to transmit signals that may be received by a receiving device with the received power (or close to the received power). Similarly, a transmit power determined based on a received power may be determined to be equal to a transmit power used by a transmitting device to transmit signals that may be received by a receiving device with the received power (or close to the received power).

Figure 4:
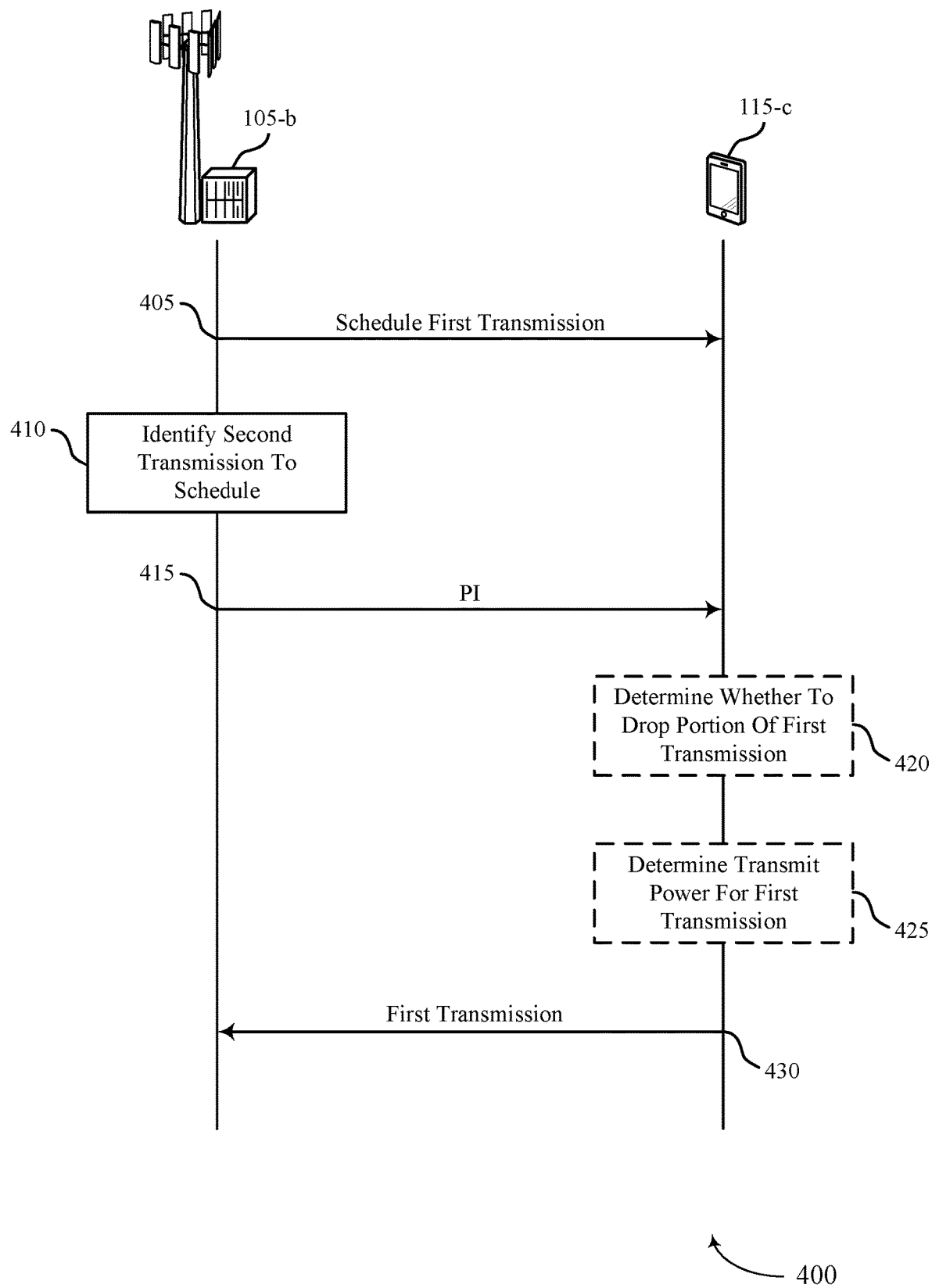
FIG. 4 illustrates an example of a process flow that supports uplink preemption or dynamic power control for MBB and low latency communication multiplexing in accordance with aspects of the present disclosure.

FIG. 4 illustrates an example of a process flow 400 that supports uplink preemption or dynamic power control for MBB and low latency communication multiplexing in accordance with aspects of the present disclosure. Process flow 400 illustrates aspects of techniques performed by a base station 105-*b*, which may be an example of a base station 105 described with reference to FIGS. 1-3. Process flow 400 also illustrates aspects of techniques performed by a UE 115-*c*, which may be an example of a UE 115 described with reference to FIGS. 1-3. UE 115-*c* may operate in an MBB mode and may be referred to as MBB UE 115-*c*.

At 405, base station 105-*b* may schedule an MBB uplink transmission from UE 115-*c*. For instance, base station 105-*b* may transmit DCI to UE 115-*c* to allocate resources for the MBB uplink transmission. At 410, base station 105-*b* may identify a low latency transmission (e.g., uplink low latency transmission) to schedule on a portion of the resources allocated for the MBB uplink transmission. Accordingly, at 415, base station 105-*b* may transmit a PI to UE 115-*c*. The PI may be a group-common PI or a UE-specific PI. After receiving the PI, UE 115-*c* may determine whether UE 115-*c* is able to adjust the transmit power to use for the MBB transmission prior to the MBB transmission.

At 420, if MBB UE 115-*c* is unable to adjust the transmit power for the MBB transmission prior to the MBB transmission (e.g., based on the time that the PI is received, a processing speed at MBB UE 115-c, or a power adjustment speed at MBB UE 115-c), MBB UE 115-c may determine whether to drop at least the portion of the MBB transmission on the resources assigned for the low latency transmission based on whether a threshold associated with an estimated uplink received power of the MBB transmission is satisfied. In particular, MBB UE 115-c may determine whether to drop at least the portion of the MBB transmission based on whether an estimated received power of the MBB transmission or another characteristic of the MBB transmission associated with the estimated received power of the MBB transmission satisfies a threshold.

The characteristic of the MBB transmission associated with the received power of the MBB transmission may refer to the estimated received power or any characteristic of the MBB transmission used to derive the estimated received power of the MBB transmission. The estimated received power of the MBB transmission is a function of the transmit power configured for the MBB transmission, and the transmit power configured for the MBB transmission is a function of cell-specific parameters and UE-specific parameters (e.g., P_0, ATF, etc.), the number of symbols scheduled for the MBB transmission, total number of bits scheduled to be included in the MBB transmission (e.g., bits per resource element (BPRE)), the modulation and coding scheme (MCS) scheduled for the MBB transmission, subcarrier spacing, etc. Thus, the characteristic of the MBB transmission may be any of these factors.

If MBB UE 115-c determines that the estimated received power is above a received power threshold (e.g., P1) (i.e., satisfies the received power threshold), MBB UE 115-c may drop the portion of the MBB transmission on the resources assigned for the low latency transmission. And, if MBB UE 115-c determines that the estimated received power is below the received power threshold (i.e., fails to satisfy the received power threshold), MBB UE 115-c may transmit an entirety of the MBB transmission. Similarly, if MBB UE 115-c determines that the MCS scheduled for the MBB transmission is above an MCS threshold (e.g., MCS1) (or any other characteristic mentioned above is above a respective threshold), MBB UE 115-c may drop the portion of the MBB transmission on the resources assigned for the low latency transmission. And, if MBB UE 115-c determines that the MCS scheduled for the MBB transmission is below the MCS threshold (or any other characteristic mentioned above is below a respective threshold), MBB UE 115-c may transmit an entirety of the MBB transmission. In some cases, the thresholds described above may be configured via higher layer signaling (e.g., in a radio resource control (RRC) message, a system information block (SIB), etc.). In other cases, the thresholds described above may be configured via DCI. For example, the thresholds may be configured for the duration of an uplink MBB transmission via the DCI used to schedule the uplink MBB transmission. In yet other cases, a first set of thresholds may be configured via higher layer signaling and a second set of thresholds may be configured via DCI.

Alternatively, at 425, if MBB UE 115-c is able to adjust the transmit power for the MBB transmission prior to the MBB transmission (e.g., based on the time that the PI is received, a processing speed at MBB UE 115-c, or a power adjustment speed at MBB UE 115-c), MBB UE 115-c may determine a transmit power for the MBB transmission based on whether one or more thresholds associated with an estimated uplink received power of the MBB transmission is satisfied. In particular, MBB UE 115-c may determine the transmit power for the MBB transmission based on whether an estimated received power of the MBB transmission or a characteristic of the MBB transmission associated with the estimated received power of the MBB transmission satisfies one or more thresholds. In some cases, MBB UE 115-c may determine the transmit power for the MBB transmission independent of dynamic power control information from base station 105-b since the grant for the MBB transmission may be received before or at the same time as the PI, and, as a result, the power adjustment for the MBB transmission may not be provided dynamically by base station 105-b.

If MBB UE 115-c determines that the estimated received power is above a first received power threshold (e.g., P1) (or if any other characteristic of the MBB transmission mentioned above is above a respective first threshold), MBB UE 115-c may reduce the transmit power for the MBB transmission to a transmit power derived based on the received power corresponding to the first received power threshold (or other respective threshold). Alternatively, if MBB UE 115-c determines that the estimated received power is below the first received power threshold (e.g., P1) and above a second received power threshold (e.g., P2) (or if any other characteristic of the MBB transmission is below a respective first threshold and above a respective second threshold), MBB UE 115-c may reduce the transmit power for the MBB transmission to a transmit power derived based on the received power corresponding to the second received power threshold (or other respective second threshold).

Further, if MBB UE 115-c determines that the estimated received power is below the first received power threshold (e.g., P1) and below the second received power threshold (e.g., P2) (or if any other characteristic of the MBB transmission is below a respective first threshold and below a respective second threshold), MBB UE 115-c may not adjust the transmit power. That is, because the interference to the low latency transmission caused by the MBB transmission transmitted using the configured transmit power may be negligible if these thresholds are not satisfied, MBB UE 115-c may use the configured transmit power to transmit the MBB transmission. In some cases, the thresholds described above may be configured via higher layer signaling (e.g., in a radio resource control (RRC) message, a system information block (SIB), etc.).

At 430, once MBB UE 115-c determines whether to drop a portion of the MBB transmission or determines a suitable transmit power for the MBB transmission, MBB UE 115-c may transmit the MBB transmission accordingly. For instance, if MBB UE 115-c determines to transmit an entirety of the MBB transmission without adjusting the power for the MBB transmission, MBB UE 115-c may transmit the entire MBB transmission with the configured transmit power without preempting the MBB transmission. If MBB UE 115-c determines to drop a portion of the MBB transmission, MBB UE 115-c may transmit the MBB transmission without the preempted portion of the MBB transmission. If MBB UE 115-c determines to adjust the power of the MBB transmission to accommodate the low latency transmission, MBB UE 115-c may adjust the transmit power and transmit the MBB transmission with the adjusted transmit power.

In some cases, when MBB UE 115-c drops the portion of the MBB transmission based on receiving the PI, MBB UE 115-c may transmit the remainder of the MBB transmission after the preempted portion of the MBB transmission (e.g., if MBB UE 115-c is capable of transmitting the remainder of the MBB transmission after the preempted portion). In other cases, however, when MBB UE 115-c drops the portion of the MBB transmission based on receiving the PI, MBB UE 115-c may not transmit the remainder of the MBB transmission after the preempted portion of the MBB transmission (e.g., if MBB is incapable of transmitting the remainder of the MBB transmission after the preempted portion).

In the examples described above, MBB UE 115-c may first determine whether MBB UE 115-c is able to adjust the transmit power for an MBB transmission prior to the MBB transmission. Then, if MBB UE 115-c is unable to adjust the transmit power for the MBB transmission prior to the MBB transmission, MBB UE 115-c may determine whether to drop the MBB transmission using the techniques described above. And, if MBB UE 115-c is able to adjust the transmit power for the MBB transmission prior to the MBB transmission, MBB UE 115-c may determine the transmit power for the MBB transmission using the techniques described above.

In some cases, however, MBB UE 115-c may not be configured to adjust the power of an MBB transmission to accommodate a low latency transmission after receiving a PI, or MBB UE 115-c may be incapable of adjusting the transmit power of an MBB transmission to accommodate a low latency transmission after receiving a PI. Instead, the MBB UE 115-c may be configured to preempt the MBB transmission to accommodate the low latency transmission (i.e., regardless of whether the MBB UE 115-c has sufficient time to adjust the transmit power for the MBB transmission prior to the MBB transmission). In such cases, when MBB UE 115-c receives and decodes a PI, MBB UE 115-c may determine whether to drop a portion of the MBB transmission using the techniques described above (e.g., based on comparing a characteristic associated with the received power of the MBB transmission to a threshold) without first determining whether MBB UE 115-c is able to adjust the transmit power for the MBB transmission.

In other cases, MBB UE 115-c may not be configured to preempt an MBB transmission to accommodate a low latency transmission after receiving a PI, or MBB UE 115-c may be incapable of preempting an MBB transmission to accommodate a low latency transmission after receiving a PI. Instead, the MBB UE 115-c may be configured to adjust the transmit power for the MBB transmission (e.g., if possible and appropriate) to accommodate the low latency transmission. In such cases, when MBB UE 115-c receives and decodes a PI, MBB UE 115-c may adjust the transmit power for an MBB transmission (when appropriate) using the techniques described above (e.g., based on comparing a characteristic associated with the received power of the MBB transmission to a threshold) if the MBB UE 115-c is able to adjust the transmit power for the MBB transmission.

Alternatively, rather than adjusting the transmit power based on the PI, MBB UE 115-c may receive a different indication from base station 105-b to adjust the transmit power for an MBB transmission based on the thresholds described above, or base station 105-b may indicate the transmit power for MBB UE 115-c to use for the MBB transmission. The indication may be included in the DCI used to schedule the MBB transmission. If the MBB UE 115-c is unable to adjust the transmit power for the MBB transmission prior to the MBB transmission, MBB UE 115-c may transmit the MBB transmission (e.g., without adjusting the transmit power because of low latency preemption).

Figure 5:
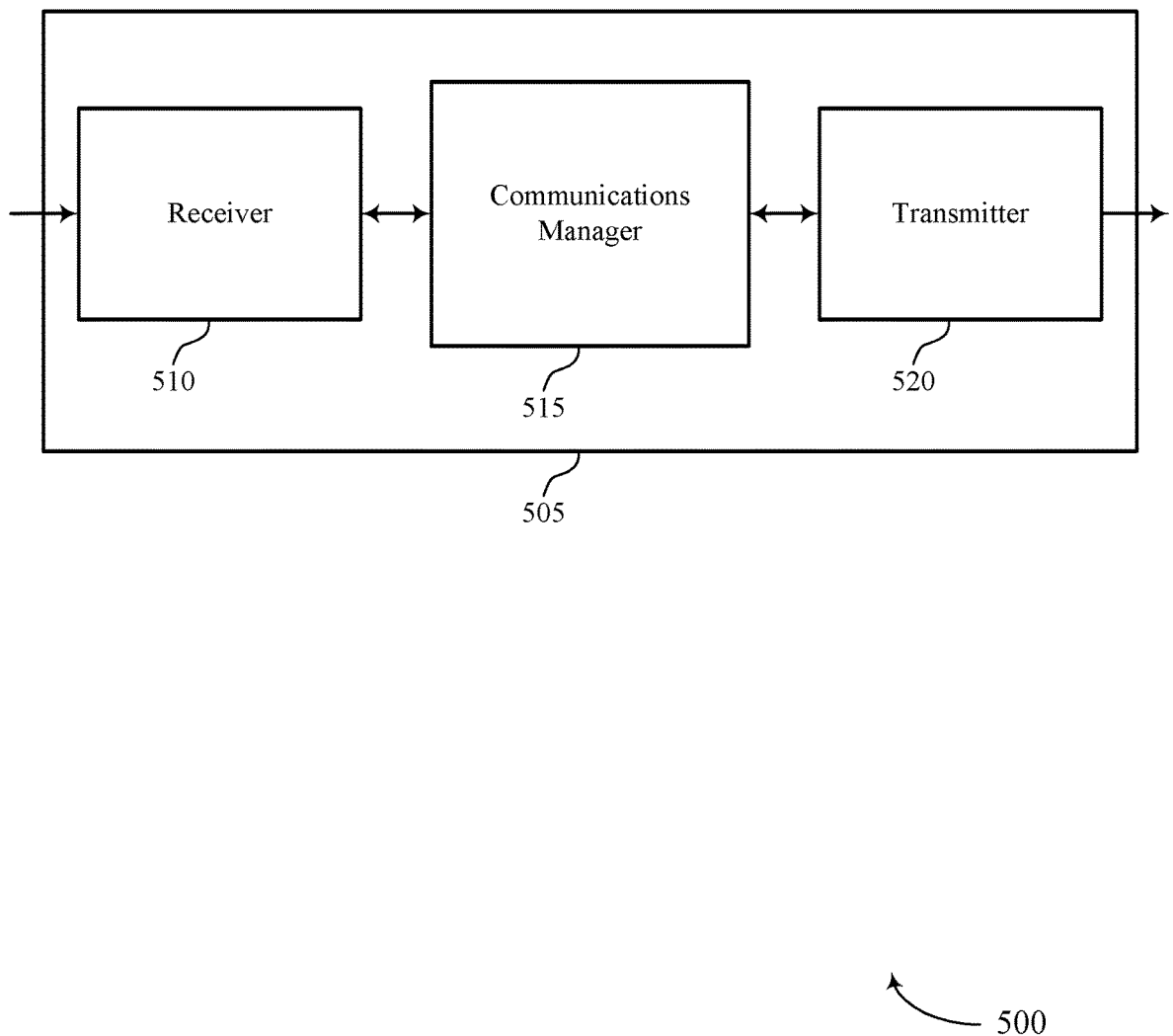
FIGS. 5 and 6 show block diagrams of a device that supports uplink preemption or dynamic power control for MBB and low latency communication multiplexing in accordance with aspects of the present disclosure.

FIG. 5 shows a block diagram 500 of a wireless device 505 that supports uplink preemption or dynamic power control for MBB and low latency communication multiplexing in accordance with aspects of the present disclosure. Wireless device 505 may be an example of aspects of a UE 115 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to uplink preemption or dynamic power control for MBB and low latency communication multiplexing, etc.). Information may be passed on to other components of the device. The receiver 510 may be an example of aspects of the transceiver 735 described with reference to FIG. 7. The receiver 510 may utilize a single antenna or a set of antennas.

Communications manager 515 may be an example of aspects of the communications manager 715 described with reference to FIG. 7. Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may identify a transmission time interval allocated for a first transmission, receive a PI indicating that a portion of the transmission time interval is preempted (e.g., assigned for a second transmission), determine whether a threshold associated with an estimated uplink received power of the first transmission is satisfied, determine whether to drop at least a portion of the first transmission in the transmission time interval based on whether the threshold associated with the estimated UL received power of the first transmission is satisfied, and transmit the first transmission during the transmission time interval in accordance with the determination of whether to drop at least the portion of the first transmission. The communications manager 515 may also identify a transmission time interval allocated for a first transmission, receive a PI indicating that a portion of the transmission time interval is preempted (e.g., assigned for a second transmission), determine whether at least one threshold associated with an estimated UL received power of the first transmission is satisfied, determine a transmit power to use for the first transmission in the transmission time interval based on whether the at least one threshold associated with the estimated UL received power of the first transmission is satisfied, and transmit the first transmission during the transmission time interval in accordance with the determination of the transmit power to use for the first transmission.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
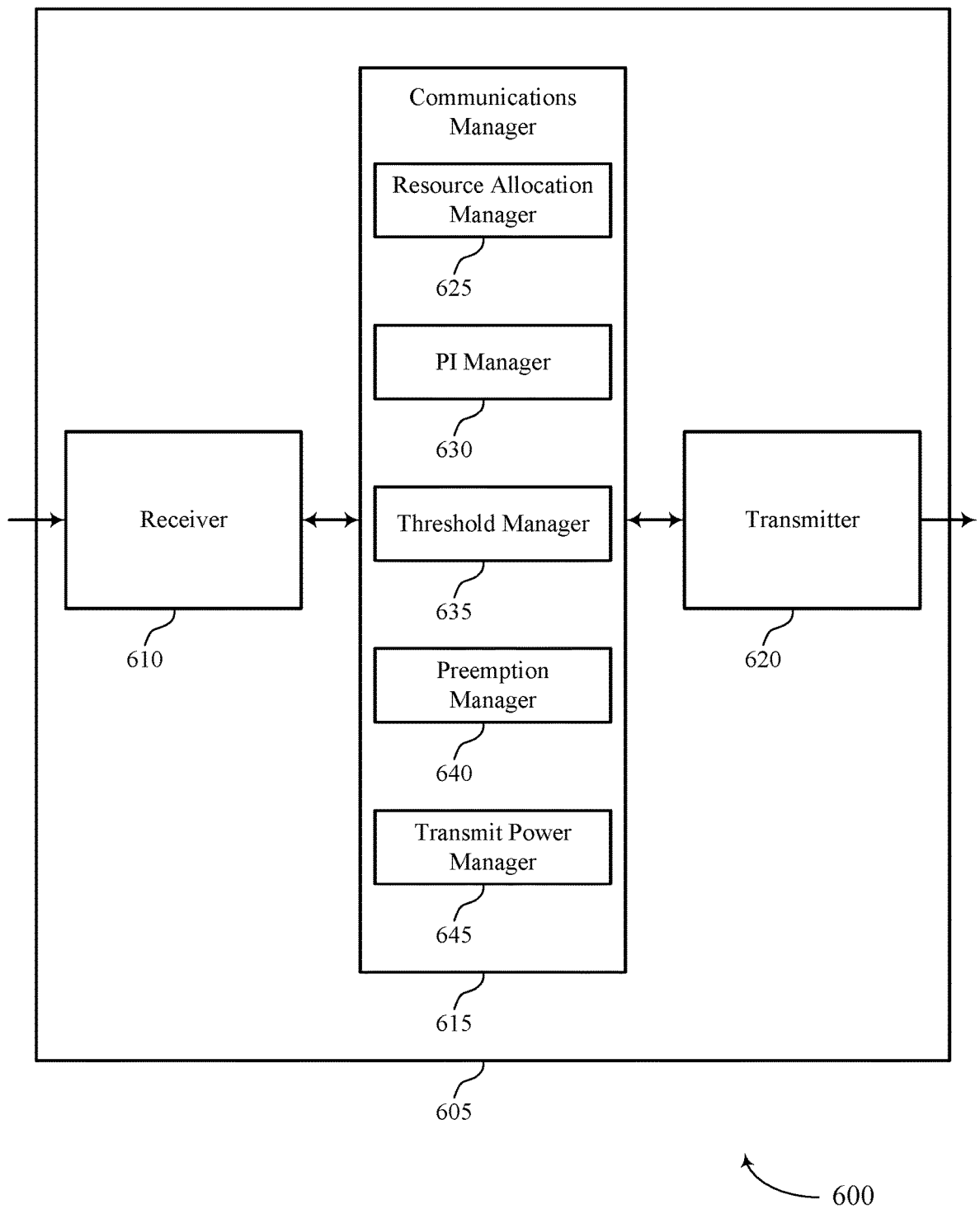

FIG. 6 shows a block diagram 600 of a wireless device 605 that supports uplink preemption or dynamic power control for MBB and low latency communication multiplexing in accordance with aspects of the present disclosure. Wireless device 605 may be an example of aspects of a wireless device 505 or a UE 115 as described with reference to FIG. 5. Wireless device 605 may include receiver 610, communications manager 615, and transmitter 620. Communications manager 615 may be an example of aspects of the communications manager 715 described with reference to FIG. 7. Communications manager 615 may include resource allocation manager 625, PI manager 630, threshold manager 635, preemption manager 640, and transmit power manager 645. Wireless device 605 may also include a processor. Each of these components may be in communication with one another (e.g., via one or more buses).

Receiver 610 may receive information such as packets, user data, or control information associated with various information channels (e.g., control channels, data channels, and information related to uplink preemption or dynamic power control for MBB and low latency communication multiplexing, etc.). Information may be passed on to other components of the device. The receiver 610 may be an example of aspects of the transceiver 735 described with reference to FIG. 7. The receiver 610 may utilize a single antenna or a set of antennas.

Resource allocation manager 625 may identify a transmission time interval allocated for a first transmission. PI manager 630 may receive a PI indicating that a portion of the transmission time interval is preempted (e.g., assigned for a second transmission). Threshold manager 635 may determine whether a threshold associated with an estimated UL received power of the first transmission is satisfied. Preemption manager 640 may determine whether to drop at least a portion of the first transmission in the transmission time interval based on whether the threshold associated with the estimated UL received power of the first transmission is satisfied. Communications manager 615 may then transmit the first transmission during the transmission time interval in accordance with the determination of whether to drop at least the portion of the first transmission.

Transmit power manager 645 may determine that the UE is unable to adjust the transmit power to use for the first transmission prior to the first transmission after receiving the PI. In some cases, determining whether to drop at least the portion of the first transmission in the transmission time interval is further based on the UE being unable to adjust the transmit power to use for the first transmission prior to the first transmission after receiving the PI. In some cases, determining that the UE is unable to adjust the transmit power to use for the first transmission prior to the first transmission after receiving the PI is based on a receive time of the PI, a processing speed at the UE for processing the PI, a transmit power adjustment speed at the UE for adjusting the transmit power, a capability of the UE, or a combination thereof.

In some cases, preemption manager 640 may determine to drop at least the portion of the first transmission when a characteristic of the first transmission satisfies the threshold, and preemption manager 640 may determine to transmit an entirety of the first transmission when the characteristic of the first transmission fails to satisfy the threshold. In some cases, the characteristic of the first transmission includes the estimated UL received power of the first transmission and the threshold associated with the estimated UL received power of the first transmission includes a threshold received power. In some cases, the characteristic of the first transmission includes a MCS scheduled for the first transmission and the threshold associated with the estimated UL received power of the first transmission includes a threshold MCS.

In some cases, the characteristic of the first transmission includes a number of symbols scheduled for the first transmission and the threshold associated with the estimated UL received power of the first transmission includes a threshold number of symbols. In some cases, the characteristic of the first transmission includes a number of bits to be included in the first transmission and the threshold associated with the estimated UL received power of the first transmission includes a threshold number of bits. In some cases, the characteristic of the first transmission includes a subcarrier spacing scheduled for the first transmission and the threshold associated with the estimated UL received power of the first transmission includes a threshold subcarrier spacing.

In some cases, the PI includes a group-common PI or a UE-specific PI. In some cases, the second transmission has a higher priority than the first transmission. In some cases, the first transmission includes an MBB transmission, and the second transmission includes a low latency transmission. In some cases, the threshold associated with the estimated UL received power of the first transmission is configured via higher layer signaling. In some cases, the higher layer signaling includes RRC signaling or system information signaling. In some cases, the threshold associated with the estimated UL received power of the first transmission is configured via DCI.

Resource allocation manager 625 may identify a transmission time interval allocated for a first transmission. PI manager 630 may receive a PI indicating that a portion of the transmission time interval is preempted (e.g., assigned for a second transmission). Threshold manager 635 may determine whether at least one threshold associated with an estimated UL received power of the first transmission is satisfied. Transmit power manager 645 may determine a transmit power to use for the first transmission in the transmission time interval based on whether the at least one threshold associated with the estimated UL received power of the first transmission is satisfied. Communications manager 615 may then transmit the first transmission during the transmission time interval in accordance with the determination of the transmit power to use for the first transmission.

In some cases, transmit power manager 645 may determine that the UE is able to adjust the transmit power to use for the first transmission prior to the first transmission after receiving the PI. In some cases, determining the transmit power to use for the first transmission in the transmission time interval is further based on the UE being able to adjust the transmit power to use for the first transmission prior to the first transmission after receiving the PI. In some cases, transmit power manager 645 may determine that the UE is able to adjust the transmit power to use for the first transmission prior to the first transmission after receiving the PI is based on a receive time of the PI, a processing speed at the UE for processing the PI, a transmit power adjustment speed at the UE for adjusting the transmit power, or a combination thereof.

In some cases, transmit power manager 645 may determine the transmit power to use for the first transmission in the transmission time interval based on whether a characteristic of the first transmission satisfies the at least one threshold. In some cases, transmit power manager 645 may determine that the characteristic of the first transmission satisfies a first threshold associated with the estimated UL received power of the first transmission, and transmit power manager 645 may adjust the transmit power for the first transmission based on a received power corresponding to the first threshold. In some cases, transmit power manager 645 may determine that the characteristic of the first transmission fails to satisfy a first threshold associated with the estimated UL received power of the first transmission and satisfies a second threshold associated with the estimated UL received power of the first transmission, and transmit power manager 645 may adjust the transmit power for the first transmission based on a received power corresponding to the second threshold. In some cases, transmit power manager 645 may determine that the characteristic of the first transmission fails to satisfy a first threshold associated with the estimated UL received power of the first transmission and a second threshold associated with the estimated UL received power of the first transmission, and transmit power manager 645 may avoid adjusting the transmit power for the first transmission.

In some cases, the characteristic of the first transmission includes a received power of the first transmission and the at least one threshold associated with the received power of the first transmission includes a threshold received power. In some cases, the characteristic of the first transmission includes an MCS scheduled for the first transmission and the at least one threshold associated with the received power of the first transmission includes a threshold MCS. In some cases, the characteristic of the first transmission includes a number of symbols scheduled for the first transmission and the at least one threshold associated with the received power of the first transmission includes a threshold number of symbols. In some cases, the characteristic of the first transmission includes a number of bits to be included in the first transmission and the at least one threshold associated with the received power of the first transmission includes a threshold number of bits. In some cases, the characteristic of the first transmission includes a subcarrier spacing scheduled for the first transmission and the at least one threshold associated with the estimated UL received power of the first transmission includes a threshold subcarrier spacing.

In some cases, the PI includes a group-common PI or a UE-specific PI. In some cases, the second transmission has a higher priority than the first transmission. In some cases, the first transmission includes an MBB transmission, and the second transmission includes a low latency transmission. In some cases, the at least one threshold associated with the estimated UL received power of the first transmission is configured via higher layer signaling. In some cases, the higher layer signaling includes RRC signaling or system information signaling. In some cases, the at least one threshold associated with the estimated UL received power of the first transmission is configured via DCI.

Transmitter 620 may transmit signals generated by other components of the device. In some examples, the transmitter 620 may be collocated with a receiver 610 in a transceiver module. For example, the transmitter 620 may be an example of aspects of the transceiver 735 described with reference to FIG. 7. The transmitter 620 may utilize a single antenna or a set of antennas.

Figure 7:
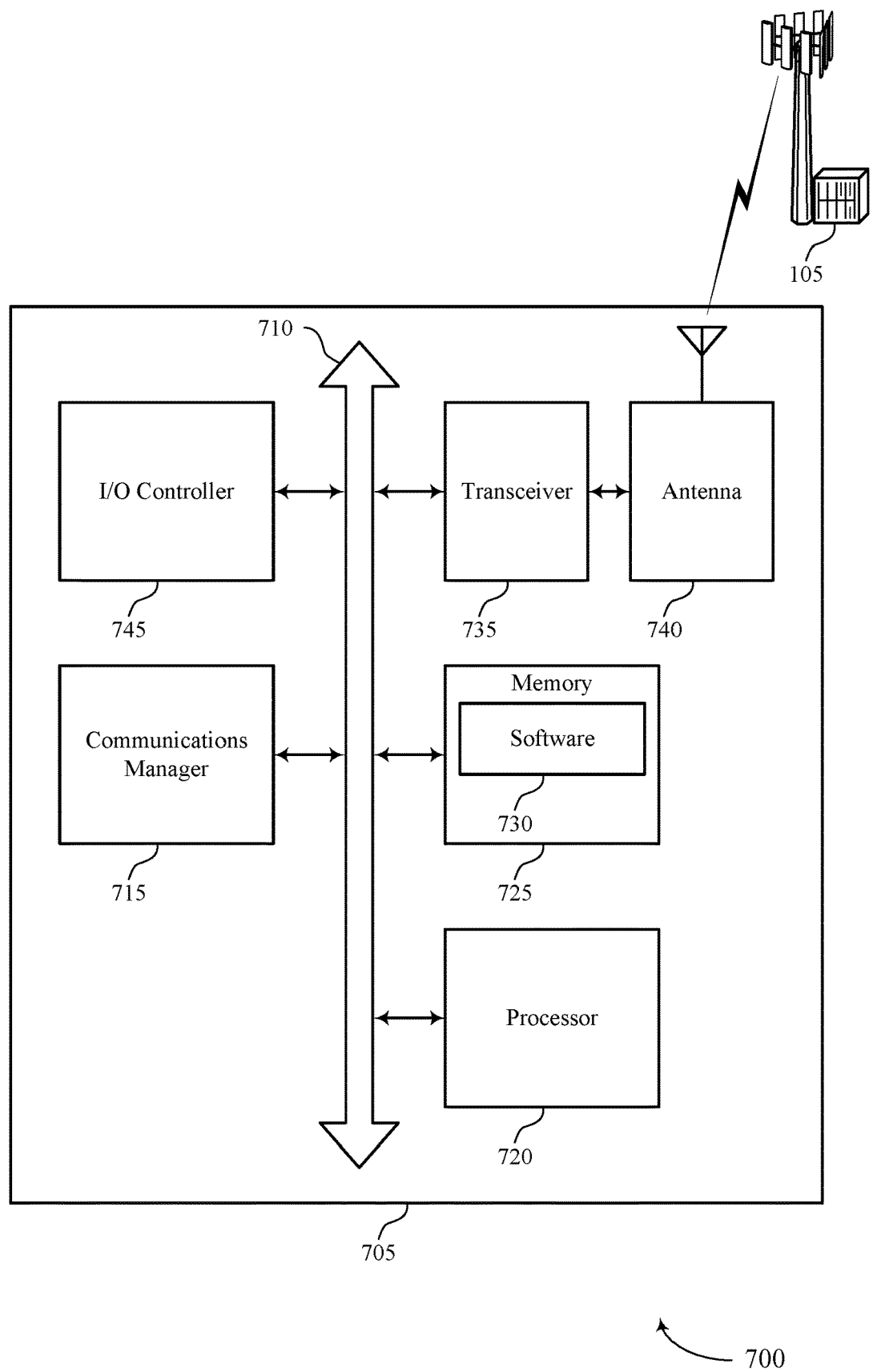
FIG. 7 illustrates a block diagram of a system including a user equipment (UE) that supports uplink preemption or dynamic power control for MBB and low latency communication multiplexing in accordance with aspects of the present disclosure.

FIG. 7 shows a diagram of a system 700 including a device 705 that supports uplink preemption or dynamic power control for MBB and low latency communication multiplexing in accordance with aspects of the present disclosure. Device 705 may be an example of or include the components of wireless device 505, wireless device 605, or a UE 115 as described above, e.g., with reference to FIGS. 5 and 6. Device 705 may include components for bi-directional voice and data communications including components for transmitting and receiving communications, including communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting uplink preemption or dynamic power control for MBB and low latency communication multiplexing).

Memory 725 may include random-access memory (RAM) and read-only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support uplink preemption or dynamic power control for MBB and low latency communication multiplexing. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
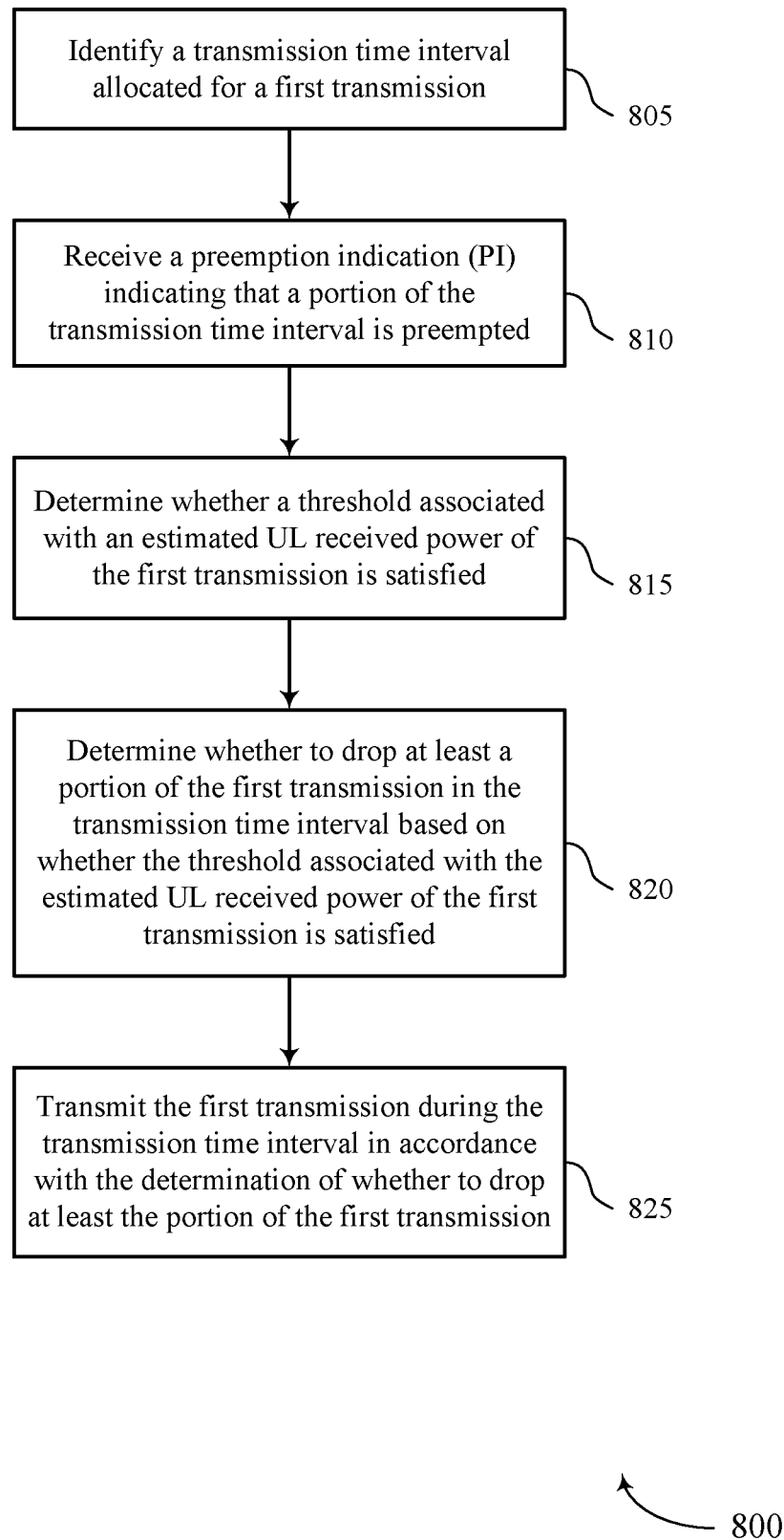
FIGS. 8 and 9 illustrate methods for uplink preemption or dynamic power control for MBB and low latency communication multiplexing in accordance with aspects of the present disclosure.

FIG. 8 shows a flowchart illustrating a method 800 for uplink preemption or dynamic power control for MBB and low latency communication multiplexing in accordance with aspects of the present disclosure. The operations of method 800 may be implemented by a UE 115 or its components as described herein. For example, the operations of method 800 may be performed by a communications manager as described with reference to FIGS. 5 through 7. In some examples, a UE 115 may execute a set of codes to control the functional elements of the device to perform the functions described below. Additionally, or alternatively, the UE 115 may perform aspects of the functions described below using special-purpose hardware.

At 805 the UE 115 may identify a transmission time interval allocated for a first transmission. The operations of 805 may be performed according to the methods described herein. In certain examples, aspects of the operations of 805 may be performed by a resource allocation manager as described with reference to FIGS. 5 through 7.

At 810 the UE 115 may receive a PI indicating that a portion of the transmission time interval is preempted. As an example, the preemption may occur as a result of the portion of the transmission time interval being assigned for a second transmission. The operations of 810 may be performed according to the methods described herein. In certain examples, aspects of the operations of 810 may be performed by a PI manager as described with reference to FIGS. 5 through 7.

At 815 the UE 115 may determine whether a threshold associated with an estimated uplink received power of the first transmission is satisfied. The operations of 815 may be performed according to the methods described herein. In certain examples, aspects of the operations of 815 may be performed by a threshold manager as described with reference to FIGS. 5 through 7.

At 820 the UE 115 may determine whether to drop at least a portion of the first transmission in the transmission time interval based at least in part on whether the threshold associated with the estimated UL received power of the first transmission is satisfied. The operations of 820 may be performed according to the methods described herein. In certain examples, aspects of the operations of 820 may be performed by a preemption manager as described with reference to FIGS. 5 through 7.

At 825 the UE 115 may transmit the first transmission during the transmission time interval in accordance with the determination of whether to drop at least the portion of the first transmission. The operations of 825 may be performed according to the methods described herein. In certain examples, aspects of the operations of 825 may be performed by a transmitter as described with reference to FIGS. 5 through 7.

Figure 9:
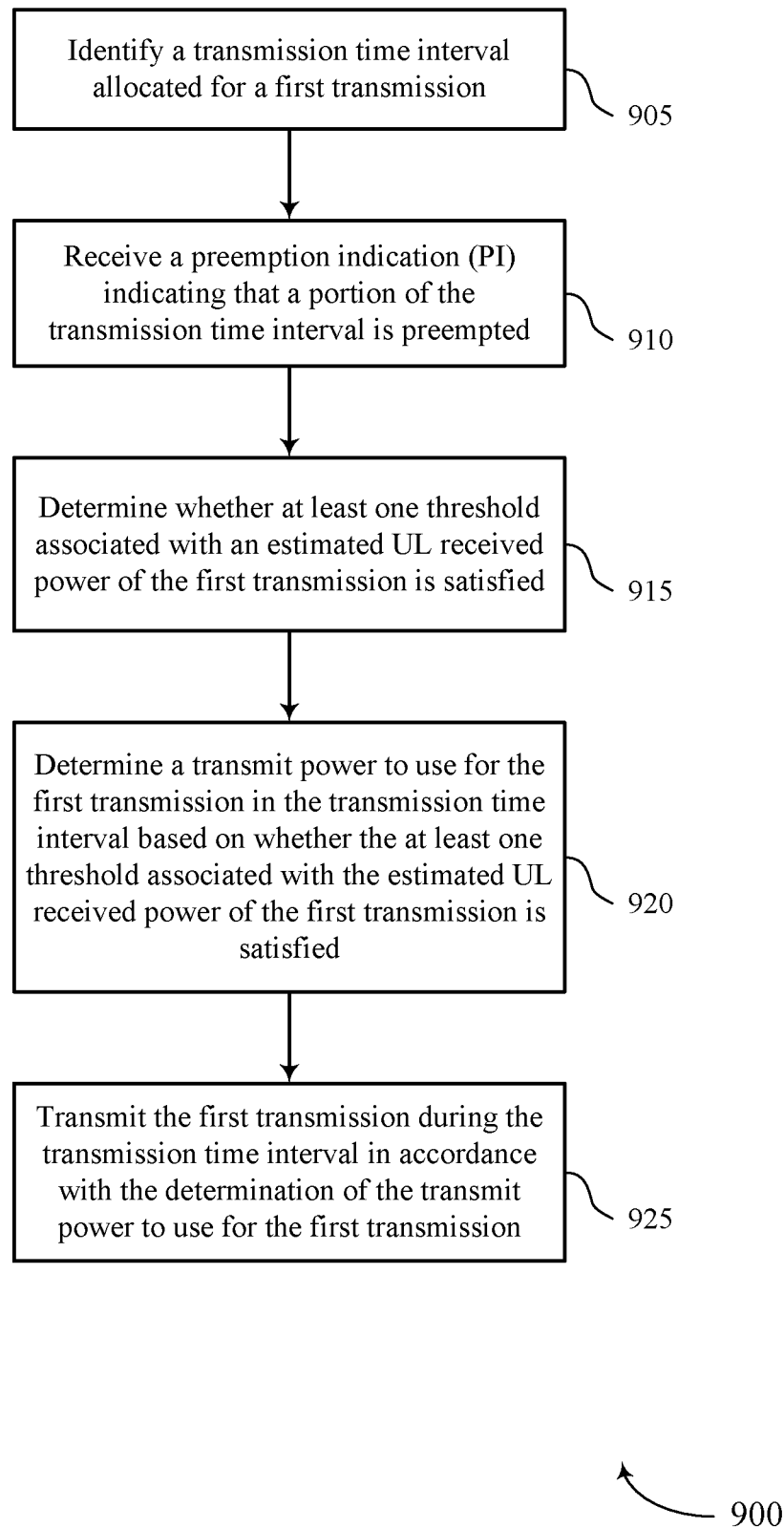

FIG. 9 shows a flowchart illustrating a method 900 for uplink preemption or dynamic power control for MBB and low latency communication multiplexing in accordance with aspects of the present disclosure. The operations of method 900 may be implemented by a UE 115 or its components as described herein. For example, the operations of method 900 may be performed by a communications manager as described with reference to FIGS. 5 through 7. In some examples, a UE 115 may execute a set of codes to control the functional elements of the device to perform the functions described below. Additionally, or alternatively, the UE 115 may perform aspects of the functions described below using special-purpose hardware.

At 905 the UE 115 may identify a transmission time interval allocated for a first transmission. The operations of 905 may be performed according to the methods described herein. In certain examples, aspects of the operations of 905 may be performed by a resource allocation manager as described with reference to FIGS. 5 through 7.

At 910 the UE 115 may receive a PI indicating that a portion of the transmission time interval is preempted. As an example, the preemption may occur as a result of the portion of the transmission time interval being assigned for a second transmission. The operations of 910 may be performed according to the methods described herein. In certain examples, aspects of the operations of 910 may be performed by a PI manager as described with reference to FIGS. 5 through 7.

At 915 the UE 115 may determine whether at least one threshold associated with an estimated uplink received power of the first transmission is satisfied. The operations of 915 may be performed according to the methods described herein. In certain examples, aspects of the operations of 915 may be performed by a threshold manager as described with reference to FIGS. 5 through 7.

At 920 the UE 115 may determine a transmit power to use for the first transmission in the transmission time interval based at least in part on whether the at least one threshold associated with the estimated UL received power of the first transmission is satisfied. The operations of 920 may be performed according to the methods described herein. In certain examples, aspects of the operations of 920 may be performed by a transmit power manager as described with reference to FIGS. 5 through 7.

At 925 the UE 115 may transmit the first transmission during the transmission time interval in accordance with the determination of the transmit power to use for the first transmission. The operations of 925 may be performed according to the methods described herein. In certain examples, aspects of the operations of 925 may be performed by a transmitter as described with reference to FIGS. 5 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a transmission time interval allocated for a first transmission;
    receiving a preemption indication (PI) indicating that a portion of the transmission time interval is preempted;
    determining whether a threshold associated with an estimated uplink (UL) received power of the first transmission is satisfied;
    determining whether to drop at least a portion of the first transmission in the transmission time interval based at least in part on whether the threshold associated with the estimated UL received power of the first transmission is satisfied; and
    transmitting the first transmission during the transmission time interval in accordance with the determination of whether to drop at least the portion of the first transmission.

2. The method of claim 1, further comprising:
    determining that the UE is unable to adjust the transmit power to use for the first transmission prior to the first transmission after receiving the PI.

3. The method of claim 2, further comprising:
    determining whether to drop at least the portion of the first transmission in the transmission time interval is further based on the UE being unable to adjust the transmit power to use for the first transmission prior to the first transmission after receiving the PI.

4. The method of claim 2, further comprising:
    determining that the UE is unable to adjust the transmit power to use for the first transmission prior to the first transmission after receiving the PI is based at least in part on a receive time of the PI, a processing speed at the UE for processing the PI, a transmit power adjustment speed at the UE for adjusting the transmit power, a capability of the UE, or a combination thereof.

5. The method of claim 1, wherein determining whether to drop at least the portion of the first transmission comprises:
    determining to drop at least the portion of the first transmission when a characteristic of the first transmission satisfies the threshold; or
    determining to transmit an entirety of the first transmission when the characteristic of the first transmission fails to satisfy the threshold.

6. The method of claim 5, wherein the characteristic of the first transmission comprises the estimated UL received power of the first transmission and the threshold associated with the estimated UL received power of the first transmission comprises a threshold received power.

7. The method of claim 5, wherein the characteristic of the first transmission comprises a modulation and coding scheme (MCS) scheduled for the first transmission and the threshold associated with the estimated UL received power of the first transmission comprises a threshold MCS.

8. The method of claim 5, wherein the characteristic of the first transmission comprises a number of symbols scheduled for the first transmission and the threshold associated with the estimated UL received power of the first transmission comprises a threshold number of symbols.

9. The method of claim 5, wherein the characteristic of the first transmission comprises a number of bits to be included in the first transmission and the threshold associated with the estimated UL received power of the first transmission comprises a threshold number of bits.

10. The method of claim 5, wherein the characteristic of the first transmission comprises a subcarrier spacing scheduled for the first transmission and the threshold associated with the estimated UL received power of the first transmission comprises a threshold subcarrier spacing.

11. The method of claim 1, wherein the first transmission comprises a mobile broadband (MBB) transmission, and a second transmission that preempts the first transmission, in accordance with the PI, comprises a low latency transmission.

12. The method of claim 1, wherein the threshold associated with the estimated UL received power of the first transmission is configured via radio resource control (RRC) signaling, system information signaling, or downlink control information (DCI).

13. The method of claim 1, wherein the threshold associated with the estimated UL received power of the first transmission is configured via downlink control information (DCI).

14. A method for wireless communication at a user equipment (UE), comprising:
    identifying a transmission time interval allocated for a first transmission;
    receiving a preemption indication (PI) indicating that a portion of the transmission time interval is preempted;
    determining whether at least one threshold associated with an estimated uplink (UL) received power of the first transmission is satisfied;
    determining a transmit power to use for the first transmission in the transmission time interval based at least in part on whether the at least one threshold associated with the estimated UL received power of the first transmission is satisfied; and transmitting the first transmission during the transmission time interval in accordance with the determination of the transmit power to use for the first transmission.

15. The method of claim 14, further comprising:
determining that the UE is able to adjust the transmit power to use for the first transmission prior to the first transmission after receiving the PI.

16. The method of claim 15, further comprising:
determining the transmit power to use for the first transmission in the transmission time interval is further based on the UE being able to adjust the transmit power to use for the first transmission prior to the first transmission after receiving the PI.

17. The method of claim 15, further comprising:
determining that the UE is able to adjust the transmit power to use for the first transmission prior to the first transmission after receiving the PI is based at least in part on a receive time of the PI, a processing speed at the UE for processing the PI, a transmit power adjustment speed at the UE for adjusting the transmit power, a capability of the UE, or a combination thereof.

18. The method of claim 14, wherein determining the transmit power to use for the first transmission in the transmission time interval comprises:
determining the transmit power to use for the first transmission in the transmission time interval based at least in part on whether a characteristic of the first transmission satisfies the at least one threshold.

19. The method of claim 18, wherein determining the transmit power to use for the first transmission in the transmission time interval comprises:
determining that the characteristic of the first transmission satisfies a first threshold associated with the estimated UL received power of the first transmission; and
adjusting the transmit power for the first transmission based at least in part on a received power corresponding to the first threshold.

20. The method of claim 18, wherein determining the transmit power to use for the first transmission in the transmission time interval comprises:
determining that the characteristic of the first transmission fails to satisfy a first threshold associated with the estimated UL received power of the first transmission and satisfies a second threshold associated with the estimated UL received power of the first transmission; and
adjusting the transmit power for the first transmission based at least in part on a received power corresponding to the second threshold.

21. The method of claim 18, wherein determining the transmit power to use for the first transmission in the transmission time interval comprises:
determining that the characteristic of the first transmission fails to satisfy a first threshold associated with the estimated UL received power of the first transmission and a second threshold associated with the estimated UL received power of the first transmission; and
avoiding adjusting the transmit power for the first transmission.

22. The method of claim 18, wherein the characteristic of the first transmission comprises a received power of the first transmission and the at least one threshold associated with the received power of the first transmission comprises a threshold received power.

23. The method of claim 18, wherein the characteristic of the first transmission comprises a modulation and coding scheme (MCS) scheduled for the first transmission and the at least one threshold associated with the received power of the first transmission comprises a threshold MCS.

24. The method of claim 18, wherein the characteristic of the first transmission comprises a number of symbols scheduled for the first transmission and the at least one threshold associated with the received power of the first transmission comprises a threshold number of symbols.

25. The method of claim 18, wherein the characteristic of the first transmission comprises a number of bits to be included in the first transmission and the at least one threshold associated with the received power of the first transmission comprises a threshold number of bits.

26. The method of claim 18, wherein the characteristic of the first transmission comprises a subcarrier spacing scheduled for the first transmission and the at least one threshold associated with the estimated UL received power of the first transmission comprises a threshold subcarrier spacing.

27. The method of claim 14, wherein the first transmission comprises a mobile broadband (MBB) transmission, and a second transmission that preempts the first transmission, in accordance with the PI, comprises a low latency transmission.

28. The method of claim 14, wherein the at least one threshold associated with the estimated UL received power of the first transmission is configured via radio resource control (RRC) signaling, system information signaling, or downlink control information (DCI).

29. An apparatus for wireless communication at a user equipment (UE), comprising:
a processor;
memory in electronic communication with the processor; and
instructions stored in the memory and executable by the processor to cause the apparatus to:
identify a transmission time interval allocated for a first transmission;
receive a preemption indication (PI) indicating that a portion of the transmission time interval is preempted;
determine whether a threshold associated with an estimated uplink (UL) received power of the first transmission is satisfied;
determine whether to drop at least a portion of the first transmission in the transmission time interval based at least in part on whether the threshold associated with the estimated UL received power of the first transmission is satisfied; and
transmit the first transmission during the transmission time interval in accordance with the determination of whether to drop at least the portion of the first transmission.

30. An apparatus for wireless communication at a user equipment (UE), comprising:
a processor;
memory in electronic communication with the processor; and
instructions stored in the memory and executable by the processor to cause the apparatus to:
identify a transmission time interval allocated for a first transmission;
receive a preemption indication (PI) indicating that a portion of the transmission time interval is preempted;
determine whether at least one threshold associated with an estimated uplink (UL) received power of the first transmission is satisfied;

determine a transmit power to use for the first transmission in the transmission time interval based at least in part on whether the at least one threshold associated with the estimated UL received power of the first transmission is satisfied; and
transmit the first transmission during the transmission time interval in accordance with the determination of the transmit power to use for the first transmission.

* * * * *